United States Patent [19]

Bourlier et al.

[11] Patent Number: 5,548,015
[45] Date of Patent: Aug. 20, 1996

[54] AQUEOUS PHENOLIC RESIN DISPERSIONS

[75] Inventors: Ken A. Bourlier, Randolph, N.J.; Peggy S. Mulrenin, Tucker, Ga.

[73] Assignee: Georgia-Pacific Resins, Inc., Atlanta, Ga.

[21] Appl. No.: 377,735

[22] Filed: Jan. 25, 1995

[51] Int. Cl.$^6$ ................................................. C08L 29/04
[52] U.S. Cl. .................... 524/503; 524/508; 524/510; 524/596; 524/611
[58] Field of Search .................... 524/503, 510, 524/508, 596, 611

[56] References Cited

U.S. PATENT DOCUMENTS

| | | | |
|---|---|---|---|
| 3,870,669 | 3/1975 | Höfel et al. | 524/503 X |
| 4,122,054 | 10/1978 | Culbertson | 524/503 X |
| 4,124,554 | 11/1978 | Fry | 524/510 X |
| 4,131,582 | 12/1978 | Kako et al. | 524/510 |
| 4,167,500 | 9/1979 | Jazenski et al. | 156/335 X |
| 4,182,696 | 1/1980 | Wynstr et al. | 524/503 X |
| 4,255,486 | 3/1981 | Burke, Jr. et al. | 524/510 X |
| 4,278,579 | 7/1981 | Murphy | 524/510 |
| 4,310,653 | 1/1982 | Krajewski et al. | 528/143 |
| 4,400,229 | 8/1983 | Demmer et al. | 156/307.5 |
| 4,788,236 | 11/1988 | Kopf | 524/55 |
| 4,988,753 | 1/1991 | Rullmann et al. | 524/260 |
| 5,036,122 | 7/1991 | Auerbach et al. | 524/259 |
| 5,200,455 | 4/1993 | Warren | 524/503 X |

*Primary Examiner*—Judy M. Reddick
*Attorney, Agent, or Firm*—Banner & Allegretti, Ltd.

[57] ABSTRACT

The invention is directed to a stable phenolic dispersion of hydrophilic phenolic resin polymer using polyvinyl alcohol as protective colloid. Incorporation of a small proportion of an etherified bisphenol-A resin into an aqueous solution of a phenolic resin and a protective colloid (e.g., polyvinyl alcohol) forms a stable dispersion with low volatile organics content.

11 Claims, No Drawings

AQUEOUS PHENOLIC RESIN DISPERSIONS

BACKGROUND OF THE INVENTION

1. Field of The Invention

This invention relates to aqueous dispersions of phenolic resin. In particular, this invention relates to stable resin dispersions that are heat-reactive, have outstanding chemical resistance properties, and are safe for use in contact with foodstuffs.

2. Description of Related Art

Phenolic resins are commercially important materials that are used in an array of diverse products. Examples include coatings, binders for inorganic materials, binders for organic materials, rubbers, laminates, moldings, castings, and other uses. Phenolic resin polymers are also widely used as a component in coating materials that are baked to form the coating and to adhere the coating to the substrate. Resins that tend to exhibit hydrophobicity typically provide less resistance to chemical attack. Whereas such hydrophobic polymers can be used to form aqueous heat-reactive coating compositions, they typically are not considered suitable for use in many coating applications because of their limited resistance to chemical attack.

Historically, phenolic resins were only available in organic solvent based formulations. Such formulations have lately come under pressure as manufacturers seek to find formulations that reduce the amount of volatile components. Governmental regulations often mandate significant reduction, or even elimination, of volatile organic solvents from such formulations, particularly for products having selected uses. The reduction or elimination of volatile organic solvent emissions has provided new commercial opportunities for resins dispersions with low levels of volatile organic compounds.

The art has investigated a variety of ways to make a useful, stable aqueous phenolic resin dispersion that do not pose a significant loss in either handling or performance characteristics. Aqueous dispersions have been made with gums or cellulosic materials as the dispersing agent. Such gum and cellulose-containing dispersions were, however, unsatisfactory. The storage stability was poor, and the coating suffered from poor chemical resistance due to the hydrophilic nature of the dispersing agent.

Surfactants, such as phosphate esters, have been tried. Formulations containing such surfactants provide unacceptably poor film properties caused by surface migration of the surfactant.

The use of a protective colloid material, particularly PVA, as a dispersant has been the subject of attention in the art. Such protective colloids have been used with polyacrylamide and an optional aldehyde-reactive modifier in U.S. Pat. No. 4,131,582. A protective colloid is used to stabilize a phenolic resin formed in situ with other components of the adhesive formulation according to U.S. Pat. No. 4,400,229. Novolac resins are stabilized with PVA in U.S. Pat. No. 4,788,236. Protective colloids can also be used in systems relying on an organic coupling solvent for the phenolic resin. See, U.S. Pat. Nos. 4,124,554 and 5,200,455. Unfortunately, PVA resin works well only with hydrophobic phenolic polymers (e.g., bisphenol-A) and does not form a stable dispersion with highly functional, hydrophillic resins. It would be useful to have an aqueous dispersion of such hydrophillic resins because such resins are characterized by better chemical resistance than the hydrophobic bisphenol-A resins.

There exists in the art the need for an aqueous phenolic resin formulation that provides a coating material which exhibits storage stability, chemical resistance, and ease of handling.

SUMMARY OF THE INVENTION

It is an objective of the invention to provide an aqueous dispersion of a phenolic resin that exhibits good storage stability and forms a chemically resistant coating.

It is another objective of the invention to provide a method for making an aqueous dispersion of hydrophillic resins and, in particular, resins that are highly functional.

In accordance with these and other objectives that will become apparent from the description herein, compositions according to the invention comprise an aqueous dispersion containing:

(a) a heat-reactive hydrophilic phenolic resin;

(b) a hydrophobic etherified bisphenol-A resin in an amount of at least about 10% based on the weight of said phenolic resin; and (c) a protective colloid for the dispersed resins.

The ether moieties in the bisphenol-A resin will react to maintain the desired crosslink density for good chemical resistance while simultaneously serving as a more hydrophobic component that, along with the protective colloid component, stabilize the phenolic resin in aqueous solution. The result is that coating materials containing the present aqueous resin dispersion have characteristics that are the best of the hydrophilic resins and the hydrophobic resins. The dispersion of the present invention exhibits excellent stability like hydrophobic resin dispersions, good film forming properties, and coatings that are chemically resistant like those made from hydrophilic resins.

DETAILED DESCRIPTION OF THE INVENTION

This invention is based on the discovery that it is possible to make a stable phenolic dispersion of a hydrophilic phenolic resin polymer using an etherified bisphenol-A and a protective colloid. Blending a hydrophilic base resin with a relatively small amount of a hydrophobic etherified bisphenol-A resin allows the base polymer to become essentially completely dispersible with the protective colloid. In this manner, it is possible to obtain resins that not only provide coating materials having chemical resistance comparable to that of coatings comprising only hydrophilic resin but also are low in volatile organic compounds. Thus, such coating materials are suitable for use under conditions requiring low emission of volatile organic compounds. Further, such resins are provided in the form of an aqueous stable emulsion or dispersion.

Coatings from the present resin dispersion will protect surfaces (particularly metal surfaces) against solvents and many organic chemicals. It has good corrosion resistance and will form coatings that can be used in severe operating environments.

The solids content of the components preferably is maximized, typically balancing the solids concentration of the component with the viscosity of the solution, towards the goal of reducing the amount of diluent introduced into the system A solids concentration for each component of at least about 40%, preferably about 40–90%, and most preferably about 65–85% by weight minimizes the amount of nonaqueous solvents in the dispersion. Solution viscosities are desirably within a range from about 1000 cp to about 10,000 cp. The specific gravity is preferably within a range from about 1.002 to about 1.02.

Hydrophilic Resin

The hydrophilic resin can be any heat-reactive hydrophilic reaction product of an aromatic alcohol and an aldehyde, generally known as phenolic or phenol/formaldehyde resins. By "heat-reactive" is meant that the resin will continue to polymerize when heat is applied.

Suitable aromatic alcohols for use in the present invention include phenol; phenol alkylated with an alkyl moiety having up to about 5 carbon atoms, such as o-, m-, and p-cresol, xylenol, p-tert-butylphenol, and p-amylphenol; and the class of compounds commonly known as bisphenols, (e.g., 4,4'-alkylidene-diphenol).

Examples of suitable bisphenols that can be used in the phenolic resin include 4,4'-isopropylidene-diphenol (commonly known as bisphenol-A), 4,4'-methylidene-diphenol (commonly known as bisphenol-F), and 4,4'-sec-butylidene-diphenol. Other alkylated phenols and bisphenols not specifically listed herein also are suitable.

Phenol is a preferred reactant. Adding substituents to the ring to form, e.g., bisphenols (such as bisphenol-A) or alkylated phenols (such as cresol) increases hydrophobicity. Thus, phenol is more hydrophilic than alkylated phenols, which in turn are more hydrophilic than bisphenols. The use of phenol yields a phenolic resin that is very hydrophilic and which forms a coating that has a high crosslink density and excellent chemical resistance. Also, phenol is readily available at a reasonable cost.

Representative of suitable aldehydes for use in making the present invention is formaldehyde, acetaldehyde, propionaldehyde, n-butylaldehyde, n-valeraldehyde, caproaldehyde, heptaldehyde, and straight-chain aldehydes having a carbon number up to about 8. Formaldehyde is a preferred aldehyde because it is easily available at reasonable cost.

The phenols and aldehydes specifically listed herein also are listed by the United States Food and Drug Administration as accepted for use in products in contact with food for human consumption. Thus, these compounds have the advantage of forming phenolic base resins considered suitable for use in containers for food. However, any hydrophilic phenolic base resin is suitable for use in this invention.

Any method of obtaining suitable hydrophilic phenolic base resin known to skilled practitioners may be utilized in accordance with the invention. Typically, the phenol component and the aldehyde component simply are reacted together at an elevated (above 25° C.) temperature under conditions and for a time sufficient to produce the desired resin. Often, hexamethylenetetramine or other catalyst commonly is used to catalyze the reaction of phenol and formaldehyde. Further, both solid and liquid forms of these components can be utilized. For example, skilled practitioners recognize that formaldehyde is available in many forms, including solutions, for example, in water and in methanol/water mixtures.

The chemical resistance of coatings of the invention, i.e., coatings formed from products comprising the dispersions of the invention, is related to the chemical resistance of the hydrophilic base resin. Thus, one method of increasing the chemical resistance of a coating is to increase the chemical resistance of the base resin.

Skilled practitioners recognize that chemical resistance can be increased by increasing, inter alia, the crosslink density in the resulting polymer. Also, chemical resistance is related to hydrophilicity of the resin when additional functional groups are added to increase crosslink density.

The number of functional groups in the adduct formed by the reaction of aromatic alcohol with aldehyde is limited by the number of substitutions on the aromatic ring. Skilled practitioners recognize that the hydroxyl moiety on phenol is ortho- and para- directing with regard to reaction of the aldehyde with the phenol, resulting in alkylol functionality on the ring. Thus, a phenol molecule that is unsubstituted in the ortho- and para- positions can react with up to three aldehyde molecules to form up to three alkylol moieties on the ring. Put another way, the adduct of this reaction can contain up to three functional groups. A phenol molecule substituted on either position, such as o- or p-cresol, can react with up to two aldehyde molecules. The resulting adduct thus has a functionality of two. Similarly, unsubstituted bisphenol molecules can react with up to four aldehyde molecules.

As the functionality of the adduct increases, the hydrophilicity of the resin increases and the opportunity to form crosslinks increases. As described herein with regard to the phenol moieties themselves, adding substituents to the phenol ring decreases the hydrophilic nature of the resin. Thus, bisphenols yields resin that is less hydrophilic than cresol-containing resin, which in turn is less hydrophilic than phenol-containing resin.

Crosslink density of phenolic resin is related to the relative proportion of phenol to formaldehyde in the resin. Skilled practitioners recognize that the crosslink density in a phenolic resin increases to a maximum and then decreases as the functionality is increased. It is believed that when the functionality is high, adduct moieties do not interact in a manner that causes cross linking. Conversely, when the functionality of the adduct is low, the number of functional groups on the adduct is insufficient to form an adequate number of crosslinks.

Because increased crosslink density improves chemical resistance of coatings of the invention comprising dispersions of the invention, it is preferred to utilize hydrophilic resins having high crosslink density. Preferably, the molar ratio of aldehyde (e.g., formaldehyde) to aromatic alcohol (e.g., phenol), the "F/P ratio", in the phenolic resin is between about 1 and about 2, more preferably is between about 1.1 and about 1.7, and most preferably is between about 1.2 and about 1.5 The F/P ratio is calculated on a "per aromatic ring" basis.

Etherified Resin

The inventors have discovered that blending an etherified bisphenol-A to an aqueous phenolic resin provides a stable dispersion without adversely affecting the chemical resistance of a coating made therefrom. Aqueous phenolic resin dispersions containing bisphenol-A can crosslink with the phenolic resin and with other components in the coating to form a coating with high resistance to degradation by chemicals including acids. Bisphenol-A also has the advantage of being available at reasonable price and provides an etherified resin with a sufficiently high degree of hydrophobicity.

The etherified bisphenol-A resin component is added to the aqueous solution of phenolic resin in an amount of at least about 10 wt %, preferably within the range from about 10 wt % to about 55 wt %, more preferably in an amount within the range from about 20 and about 40 wt %, and most preferably in an amount from about 25 and about 30 wt % based on the weight of the phenolic resin.

Quantities less than about 10 wt percent typically fail to provide stable dispersions. The exact upper limit on the quantity of etherified resin depends on the characteristics of the resin. Quantities greater than about 55 wt percent may not provide a coating with sufficient chemical resistance to be comparable to those provided by coatings containing only hydrophilic resin although such coatings are useful for many application where such high resistance is not required. With the guidance provided herein, skilled practitioners will be able to determine the exact upper limit of the quantity of etherified resin.

The bisphenol-A can be made into an ether form with a variety of conventional processes. Typically, an adduct of aldehyde and bisphenol-A is first formed with a number of alkylol moieties. The alkylol moieties are then reacted with an alcohol to form ether moieties. These ether moieties will form crosslinks in the resulting coating that will maintain the desired crosslink density but with a sufficiently different degree of hydrophobicity that the phenolic resin can be formed into a stable aqueous dispersion.

Suitable aldehydes for reaction with the bisphenol-A include formaldehyde, acetaldehyde, propionaldehyde, n-butylaldehyde, n-valeraldehyde, caproaldehyde, heptaldehyde, and straight-chain aldehydes having a carbon number up to about 8. Formaldehyde is a preferred aldehyde because it is easily available at reasonable cost.

The functionality of the bisphenol-A/aldehyde adduct can be between one and four, i.e., the adduct can contain between one and four alkylol moieties per bisphenol. Preferably, the functionality of the adduct is between about 1 and about 3.5, more preferably between about 1.5 and about 3, and most preferably between about 1.75 and about 2.75.

The adducts used in a particular resin formulation need not all have the same degree or type of functionality. Skilled practitioners recognize that it is not practical to ensure that each adduct moiety has exactly the same functionality and that fractional functionality values are obtained in a resin having moieties at different functional values. The functionality of an adduct is an arithmetic average of the functionalities of the individual adduct moieties in the resin. Thus, a blend of equal portions of adducts having functionalities of 2 and 3 is considered to have a functionality equal to 2.5.

Preferred adducts include 2-methylol-4,4'-isopropylidene-diphenol; 2,2'-dimethylol- 4,4'-isopropylidene-diphenol; 6-methylol-4,4'-isopropylidene-diphenol; 6,6'-dimethylol- 4,4'-isopropylidene-diphenol; 2,6'-dimethylol-4,4'-isopropylidene-diphenol; 2,6,2'-trimethylol-4,4'-isopropylidene-diphenol; 2,6,6'-trimethylol-4,4'-isopropylidene-diphenol; and 2,6,2', 6'-tetramethylol-4,4'-isopropylidene-diphenol.

Alkylol moieties on the adduct are reacted with an alcohol to form ethers and make the molecule more hydrophobic. Skilled practitioners recognize that ether formation according to the present invention can be effected with any alcohol. Alcohols particularly useful for the ether formation are desirably water immiscible, and more preferably, are straight chain alcohols with not more than about 8 carbon atoms. An alcohol molecule that is too large can cause the resulting etherified resin to lose compatibility with other resins in the coating. The preferred alcohols for ether formation according to the present invention include the butanols, pentanols, hexanols, heptanols, and octanols. The more preferred alcohols include n-butanol, n-pentanol, n-hexanol, n-heptanol, and n-octanol.

The most preferred alcohol is n-butanol. It is available in commercial quantity at an attractive price, and is the lowest straight chain, non-water miscible alcohol. The resulting etherified moiety is as easily crosslinked as the hydroxyl moiety to which the butyl moiety is attached.

The use of water miscible alcohols (e.g., methanol, ethanol, and propanol) is not preferred for reasons of process economics. Use of a water miscible alcohol is generally characterized by the use of a large recycle stream. Further, lower alcohols tend to yield less effective etherified resins than the water immiscible alcohols.

An especially preferred etherified resin is the reaction product of bisphenol-A and formaldehyde using a base catalyst with subsequent etherification in n-butanol. Specifically, the bisphenol-A and formaldehyde are reacted at about 50°–100° C. and diluted with a solvent. A phosphoric acid catalyst is added, and the mixture heated at a temperature within about 70°–120° C. until the etherification reaction is complete. Such etherified resins are available commercially from Georgia-Pacific Resin Incorporated, Atlanta, Ga. and is designated GP-7550®resin. This product has a functionality of about 2.3 in n-butanol. The concentration of resin is at least about 60 percent. This resin has a high degree of hydrophobicity, exhibits the ability to form crosslinks in a coating, and contains a high concentration of resin solids. Further, each of the components is considered by the FDA to be acceptable for use in contact with food products.

The extremely hydrophobic nature of etherified bisphenol-A resin makes it easy to form a dispersion of resin in aqueous medium. It becomes difficult if the etherified resin is dissolved in a non-water miscible solvent, as it often is. For example, GP-7550®, a most preferred etherified bisphenol-A resin product, contains both extremely hydrophobic resin and non-water miscible n-butanol.

If desired, a water miscible solvent can be added as a stabilizer to increase the water miscibility of resin and non-water miscible solvent present therewith. Such a stabilizing solvent is miscible with the resin, with non-water miscible solvent, and with water. A preferred stabilizing solvent is diethylene glycol butyl ether which is available from Union Carbide under the trademark butyl-Carbitol®. Other such stabilizing solvents meeting the solubility requirements described herein may be employed.

Protective Colloid

Protective colloids useful in the invention include materials that will form crosslinks with the phenolic resin upon curing and that will stabilize hydrophilic phenolic resins in aqueous solution. Suitable protective colloids include nonionic colloidal materials, preferably polyvinyl alcohol or polyvinyl pyrrolidone.

Polyvinyl alcohol is the preferred protective colloid. Polyvinyl alcohol is suitable for use in coating products because it does not cause deleterious results in coatings formed therefrom. Polyvinyl alcohol also has hydrophilic hydroxyl moieties and a hydrophobic chain moiety, i.e., the polyvinyl 'spine' of the polymer. The hydrophilic moieties are soluble in the water, and the hydrophobic chain moiety interacts with and "wraps around" the hydrophobic resin. Thus, polyvinyl alcohol acts as an intermediary between the hydrophobic resin and the aqueous medium. Although the inventor does not wish to be bound by theory, it is believed that the hydrophilic resin is soluble in, or at least intermixes intimately with, the hydrophobic resin, which is present in a quantity sufficient to enable the polyvinyl alcohol to serve as protective colloid for the resins.

A particularly preferred form of polyvinyl alcohol is a solution of partially hydrolyzed (at least about 87 percent) polyvinyl alcohol having a molecular weight of between about 30,000 and about 50,000. One such product is available from the Air Products & Chemicals Company under the trade name "Airvol 205®". This product has a molecular weight of about 31,000–50,000 and a degree of hydrolyzation of about 87–89 percent.

The characteristics of coatings made from products comprising dispersion of the invention are comparable to those of hydrophilic base resin alone. As used with regard to this invention, "comparable" means that the coatings are essentially commercially interchangeable with regard to the characteristics considered as a whole.

Dispersion Formation

In accordance with the invention, a suitable dispersion is able to maintain the dispersion for an extended period of time. A nonstable dispersion is characterized by greater than 10% of its particle size distribution over 10 microns. Such particles are sufficiently large to settle out upon storage. Accordingly, a stable dispersion has less than 10% of particles greater than 10 microns.

To form the aqueous dispersion of the invention, the hydrophilic base resin and the etherified resin are combined in aqueous medium along with the protective colloid and blended with energy sufficient to form the desired dispersion. The components need only be in a state suitable for forming the desired dispersion, and need not be combined in any particular order.

For example, the hydrophilic base resin is usually available as a viscous fluid or a solid. It may be supplied in association with water or a viscosity-reducing agent (e.g., ethanol) or devoid thereof.

The etherified resin may be supplied in solid or viscous fluid form. Often, at least one solvent is present with the etherified resin.

Product Formulation

Small amounts of water miscible coalescing solvents can be used to facilitate blending and dilution of the present phenolic dispersion. Diethylene glycol butyl ether or 2-butoxyethanol are preferred co-solvents that can be used in an amount within the range from about 0.01 wt % to about 10 wt % and are best added to the water charge before admixture with the phenolic resin dispersion.

Flexibility in a coating made with phenolic resin of the present invention can be imparted by mixing the present dispersion with 30–95 wt % of a latex-based or aqueous phenoxy resins. The pH of the present dispersion should be first adjusted to match that of the flexible resin material. Preferably, amines are used to adjust the dispersion pH. Triethanolamine (TEA) and dimethylethanolamine (DMEA) are useful amines for pH adjustment.

The aqueous dispersion of the present invention is an opaque, white liquid that is intended to replace solvent-based phenolic resins where low volatile organics (VOC) restrictions apply. As such, the present dispersion can be used where solvent-based and aqueous phenolic resins have been used previously.

The present dispersion can be used for a wide variety of applications. Examples include: adhesives for use in components associated with packaging, transporting, or handling food; coatings used as the food contact surfaces of articles used in producing, manufacturing, packaging, processing, transporting or holding of food; a component of coated or uncoated paper and paperboard that contacts foods; and sealing gaskets for food containers.

The present dispersion is particularly useful as a component in a coating formulation used for surfaces that will contact food. The coating formulation containing the present phenolic dispersion is first applied to a surface that might come into contact with food and then baked for a time sufficiently long and a temperature sufficiently high to form a cured, crosslinked coating. The time and temperature for the baking process are comparable to those for solvent-based phenolic resins but increased slightly. In general, curing times and temperatures range from less than about 30 minutes at 190° C. to less than about 15 minutes at 215° C.

The following examples illustrate the invention, but should not be considered to limit it in any way. Throughout the examples, "parts" means "parts by weight" unless otherwise identified.

EXAMPLES

Example 1

To a suitable vessel, 100 parts phenol, 70 parts of formaldehyde, and 17 parts water were charged and heated to 45° C. Heating was continued while 5 parts of a 33 wt percent aqueous solution of hexamethylenetetramine were added. Heating was stopped when reflux began under vacuum conditions, about 60° C. The temperature of the reacting mixture increased to about 100° C. as reaction continued.

After about 65 minutes of reaction time, the temperature was reduced to about 85° C. and about 70 parts water were removed by distillation. About 13 parts ethanol were added to reduce the viscosity of the phenol/formaldehyde reaction mixture. The mixture then was again heated to about 90° C. and allowed to further react and form the phenolic hydrophilic base resin.

Hydrophobic resin was prepared separately with the materials in Table 1.

TABLE 1

| Component | Parts by Weight |
| --- | --- |
| Bisphenol-A | 2005 |
| 50% HCHO | 965 |
| 50% NaOH | 13 |
| 50% HCHO | 614 |
| (distillate) | (757) |
| n-butanol | 895 |
| Sulfuric acid (96%) | 1.6 |
| Water | 33.0 |
| Phosphoric acid (85%) | 22.7 |
| n-butanol | 25.7 |
| Butyl carbitol | 921 |

The formaldehyde and Bisphenol-A were added together and heated to 60° C. Sodium hydroxide was added and heated to 75° C. under vacuum. A second quantity of formaldehyde was added over the course of 25 minutes and then held at temperature for 2 hours. The solution was allowed to cool and then subject to vacuum distillation. The n-butanol was added and allowed to cool. Thereafter, the sulfuric acid, water, phosphoric acid, and n-butanol were added and heated. Azeotrope distillation continued for 3 hours. The solution was allowed to cool and vacuum distilled. Butyl carbitol was added, and the resulting solution filtered at 65° C. The resulting solution had a solids concentration of about 70 wt percent.

About 37 parts of thus-modified GP-7550® solution were added to the hot base resin mixture. After the resins were thoroughly mixed, about 24 parts water were added dropwise. The temperature of the mixture was reduced to between 65° and 75° C. and the mixture was stirred for about 10 minutes. A minor quantity of ammonium hydroxide was added, then 36 parts of 20 wt percent polyvinyl alcohol solution (Airvol 205® from Air Products) were added dropwise. Thus-formed suspension then was stirred for an additional 10 minutes, after which an additional 50 parts water was added.

The dispersion remained stable for more than three months. The dispersion comprises only 15 wt percent volatile solvent and is 19 wt percent hydrophobic resin, based on the weight of resin solids.

The results of the compatibility and "Chemical Spot" tests are set forth in the following table, together with comparative results of the same test on a hydrophilic, non-dispersed resin. The results of the "Chemical Spot" tests are expressed on a scale ranging from 0 (poor) to 10 (excellent).

TABLE 2

| | "Chemical Spot" Resistance Tests | |
|---|---|---|
| Test | Comparative Resin | Dispersion of Invention |
| 60% $HNO_3$ | 8 | 10 |
| 98% $H_2SO_4$ | 2 | 8+ |
| MEK | 10 | 10 |

Examples 2–4

Dispersions comprising about 9 wt percent hydrophobic resin, about 33 wt percent hydrophobic resin, and about 54 wt percent hydrophobic resin (Examples 2, 3, and 4, respectively), each based on the weight of the hydrophilic resin, as in Example 1, were prepared in essentially the same manner as set forth in Example 1.

Each of the dispersions thus made maintained their stability for at least three months.

COMPARATIVE EXAMPLES

Three batches of phenol/formaldehyde hydrophilic base resin were prepared essentially as set forth in Example 1. Each was subsequently modified as follows:

Example 5 (Comparative)

A quantity of n-butyl Carbitol® essentially equal to the quantity thereof added in Example 1 was added to the base resin; no hydrophobic resin was added. The dispersion thus formed was unsatisfactory, as it was not stable and separated within one day.

Example 6 (Comparative)

A commercially available resin, GP BKS-7570®, a methylidene-type phenol resin, was modified by addition of n-butyl Carbitol® to form a solution having 60 wt percent solids. This resin is much less hydrophobic than GP-7550®. A quantity of thus-modified resin sufficient to introduce about 35 wt percent thus-modified resin, based on the weight of the base resin, was added. A dispersion was formed, but was unstable and separated in less than three months.

Example 7 (Comparative)

A commercially available resin, GP BKS-7590®, a methylidene-type methyl phenol resin, was modified by addition of n-butyl Carbitol® to form a solution having 60 wt percent solids. This resin is more hydrophobic than GP BKS-7570®, but less hydrophobic than GP-7550®. A quantity of thus-modified resin sufficient to introduce about 35 wt percent thus-modified resin, based on the weight of the base resin, was added. A dispersion was formed, but was unstable and separated in less than three months.

We claim:

1. A composition comprising a stable aqueous dispersion of a phenolic resin wherein said dispersion comprises:
   a. a heat-reactive hydrophilic phenolic resin obtained from the reaction of an aromatic alcohol and an aldehyde;
   b. a hydrophobic etherified bisphenol-A resin in an amount of at least about 10 wt % based on the weight of said phenolic resin; and
   c. a protective colloid that will form crosslinks with said phenolic resin upon curing.

2. A composition according to claim 1 wherein said protective colloid is polyvinyl alcohol.

3. A composition according to claim 1 in which the molar ratio of aldehyde to aromatic alcohol in the phenolic resin is between about 1 and about 2.

4. A composition according to claim 1 in which the molar ratio of aldehyde to aromatic alcohol in the phenolic resin is between about 1.1 and about 1.7.

5. A composition according to claim 1 in which the molar ratio of aldehyde to aromatic alcohol in the phenolic resin is between about 1.2 and about 1.5.

6. A composition according to claim 1 in which etherified bisphenol-A is present within the range of from about 20 wt % to about 40 wt %.

7. A composition according to claim 1 in which etherified bisphenol-A is present within the range of from about 25 wt % to about 30 wt %.

8. A process for making an aqueous dispersion of phenolic resin comprising the step of:
   blending an aqueous dispersion containing: (a) a heat-reactive hydrophilic phenolic resin obtained from the reaction of an aromatic alcohol and an aldehyde, (b) a hydrophobic etherified bisphenol-A resin in an amount of at least about 10 wt % based on the weight of said phenolic resin, and (c) a protective colloid that will form crosslinks with said phenolic resin upon curing.

9. A process according to claim 8 wherein the blending step comprises:
   blending said protective colloid with said heat-reactive phenolic resin and said etherified resin whereby the resins are in aqueous solutions each of which exhibits a dry solids content of at least about 40 wt %.

10. A process according to claim 8 wherein the blending step comprises:
    blending said protective colloid with said heat-reactive phenolic resin and said etherified resin whereby the resins are in aqueous solutions each of which exhibits a dry solids content within the range of from about 40 wt % to about 90 wt %.

11. A process according to claim 8 wherein the blending step comprises:
    blending said protective colloid with said heat-reactive phenolic resin and said etherified resin whereby the resins are in aqueous solutions each of which exhibits a dry solids content within the range from about 65 wt % to about 85 wt %.

* * * * *